United States Patent
Thomson et al.

(10) Patent No.: US 7,581,169 B2
(45) Date of Patent: Aug. 25, 2009

(54) METHOD AND APPARATUS FOR FORM AUTOMATIC LAYOUT

(76) Inventors: Nicholas James Thomson, 17120 NE. 131st Pl., Redmond, WA (US) 98052; Dmitri Davydok, 9935 158th Pl. NE., Redmond, WA (US) 98052; Anthony Lee, 1143 NW. 57th St., Seattle, WA (US) 98107; Ian Carl Legler, 17404 NE. 31st Ct., Redmond, WA (US) 98052

(*) Notice: Subject to any disclaimer, the term of this patent is extended or adjusted under 35 U.S.C. 154(b) by 68 days.

(21) Appl. No.: 11/035,666

(22) Filed: Jan. 14, 2005

(65) Prior Publication Data

US 2006/0161836 A1    Jul. 20, 2006

(51) Int. Cl.
G06F 17/00    (2006.01)
(52) U.S. Cl. .................................................. 715/223
(58) Field of Classification Search ................. 715/505, 715/506, 507, 508, 221, 222, 223, 224, 225, 715/226, 243
See application file for complete search history.

(56) References Cited

U.S. PATENT DOCUMENTS

| | | | | |
|---|---|---|---|---|
| 5,367,619 A * | 11/1994 | Dipaolo et al. | ............... | 715/221 |
| 5,379,372 A * | 1/1995 | Wu | ............... | 715/236 |
| 5,425,138 A * | 6/1995 | Kumakawa | ............... | 715/223 |
| 5,521,710 A * | 5/1996 | Strossman et al. | ............... | 358/296 |
| 5,736,988 A * | 4/1998 | Shaw et al. | ............... | 345/423 |
| 5,808,914 A * | 9/1998 | Shin et al. | ............... | 703/2 |
| 5,815,595 A * | 9/1998 | Gugler | ............... | 382/173 |
| 6,182,121 B1 * | 1/2001 | Wlaschin | ............... | 709/215 |
| 6,498,863 B1 * | 12/2002 | Gaidoukevitch et al. | ............... | 382/173 |
| 6,643,825 B1 * | 11/2003 | Li et al. | ............... | 715/205 |
| 6,757,870 B1 * | 6/2004 | Stinger | ............... | 715/234 |
| 7,028,251 B2 * | 4/2006 | Draper | ............... | 715/229 |
| 7,200,810 B2 * | 4/2007 | Nitta et al. | ............... | 715/238 |
| 7,356,458 B1 * | 4/2008 | Gonos | ............... | 704/8 |
| 7,386,785 B2 * | 6/2008 | Ulmer et al. | ............... | 715/226 |
| 7,404,140 B2 * | 7/2008 | O'Rourke | ............... | 715/222 |
| 7,516,400 B2 * | 4/2009 | Ovetchkine et al. | ............... | 715/234 |
| 2001/0011364 A1 * | 8/2001 | Stoub | ............... | 717/1 |
| 2002/0070975 A1 * | 6/2002 | Sawicki et al. | ............... | 345/801 |
| 2002/0154146 A1 * | 10/2002 | Rodriquez et al. | ............... | 345/660 |
| 2003/0023626 A1 * | 1/2003 | Bretti | ............... | 707/506 |

(Continued)

OTHER PUBLICATIONS

Agrawal et al., Integrating Vertical and Horizontal Partioning Into Automated Physical Database Design, ACM 2004, pp. 1-12.*

(Continued)

*Primary Examiner*—Cong-Lac Huynh
(74) *Attorney, Agent, or Firm*—Turocy & Watson, LLP

(57) ABSTRACT

A method and apparatus are provided for determining the layout of a form automatically to accommodate text in the form. Under the method and apparatus, a set of parameters define the sizing and alignment of elements of the form. Sizing and positioning instructions that are separate from the sizing and alignment parameters set the sizing and positioning of elements of the form based on the sizing and alignment parameters. The instructions determine the minimum size for the form, based in part on text in the form. The difference between the minimum size for the form and a desired size for the form is then distributed across the form to size and position the elements in the form.

19 Claims, 7 Drawing Sheets

U.S. PATENT DOCUMENTS

| | | | |
|---|---|---|---|
| 2003/0135831 A1* | 7/2003 | Hsiao et al. | 716/4 |
| 2003/0163782 A1* | 8/2003 | Owen | 715/505 |
| 2003/0229516 A1* | 12/2003 | Nickerson | 705/2 |
| 2003/0229854 A1* | 12/2003 | Lemay | 715/513 |
| 2004/0030991 A1* | 2/2004 | Hepworth et al. | 715/507 |
| 2004/0205529 A1* | 10/2004 | Poulose et al. | 715/506 |
| 2004/0205534 A1* | 10/2004 | Koelle | 715/507 |
| 2004/0237030 A1* | 11/2004 | Malkin | 715/505 |
| 2004/0252341 A1* | 12/2004 | Adachi et al. | 358/1.18 |
| 2005/0071753 A1* | 3/2005 | Klein et al. | 715/508 |
| 2005/0237321 A1* | 10/2005 | Young et al. | 345/418 |
| 2006/0059418 A1* | 3/2006 | Elkady | 715/508 |
| 2006/0139596 A1* | 6/2006 | Edart | 355/55 |
| 2007/0005550 A1* | 1/2007 | Klein | 707/1 |
| 2007/0009158 A1* | 1/2007 | Geva et al. | 382/209 |
| 2008/0273226 A1* | 11/2008 | Adachi et al. | 358/1.18 |

OTHER PUBLICATIONS

Dejean et al., Reducing Parameter Space for Word Alignment, ACM 2003, pp. 23-26.*

Rowlett et al., Creating Accessible Web Forms, Google 2005, pp. 1-4.*

Dodson, COMAIDE: Information Visualization using Cooperative 3D Diagram Layout, Google 1996, pp. 1-12.*

* cited by examiner

METHOD AND APPARATUS FOR FORM AUTOMATIC LAYOUT

BACKGROUND OF THE INVENTION

The present invention relates to forms displayed on computing systems. In particular, the present invention relates to the layout of elements in these forms.

In computerized systems, forms are used to provide a graphical user interface that allows users to type in text, select entries, and control operation of an application by manipulating displayed controls. Designing such forms involves placing controls, such as text boxes, check boxes, combo boxes, buttons, and labels on the form and programming the operations of each control.

Many of the controls include text. For example, a button may have the word "Cancel" on it and a label may have the text "Topic."

To support the distribution of software in multiple languages, the text that is applied to controls is often stored in a resource file. This allows the text to be converted to a different language without requiring recompiling of the code that defines the form.

Ideally, the text for each control would occupy the same amount of space on the display regardless of the language it is written in. However, translation of the text from one language to another often involves a change in the number of characters that represent the word. As a result, a word in one language will require more display space than the same word in another language.

One technique for accommodating the increase in character length that can occur during translation of the text is to layout the form to accommodate the largest text strings of any of the languages that will be used in the form. This is undesirable because it requires the developer to consider every language that the form may be used in and it results in a form that has a great deal of wasted space.

Another technique for handling changes in text sizes due to translations is to change the layout of each form for each language so that the form is optimized for each language. For applications that have a large number of forms, this involves a great deal of work in order to make the application available for a large number of languages.

A third technique is to build a custom layout engine for the form that will move controls within the form based on the size of the text associated with the controls. The parameters for controlling this change in the layout are programmed and compiled with the form. As a result, it is very difficult to change the alignment and growth properties that are used by the automatic layout process. In particular, in order to change the layout formed by the automatic layout engine, the alignment and growth properties associated with various controls on the form must be changed in the programming source code for the form. This source code is then recompiled and re-tested. This is time consuming and requires expertise in the programming source code.

Thus, it is desirable to have a system that allows for automatic layout of forms to accommodate different text lengths due to language translations while at the same time facilitating changes in how the automatic layout is performed without requiring recompiling of the source code for the form.

SUMMARY OF THE INVENTION

A method and apparatus are provided for determining the layout of a form automatically to accommodate text in the form. Under the method and apparatus, a set of parameters define the sizing and alignment of elements of the form. Sizing and positioning instructions that are separate from the sizing and alignment parameters set the sizing and positioning of elements of the form based on the sizing and alignment parameters. The instructions determine the minimum size for the form, based in part on text in the form. The difference between the minimum size for the form and a desired size for the form is then distributed across the form to size and position the elements in the form.

DETAILED DESCRIPTION OF ILLUSTRATIVE EMBODIMENTS

Figure 1:
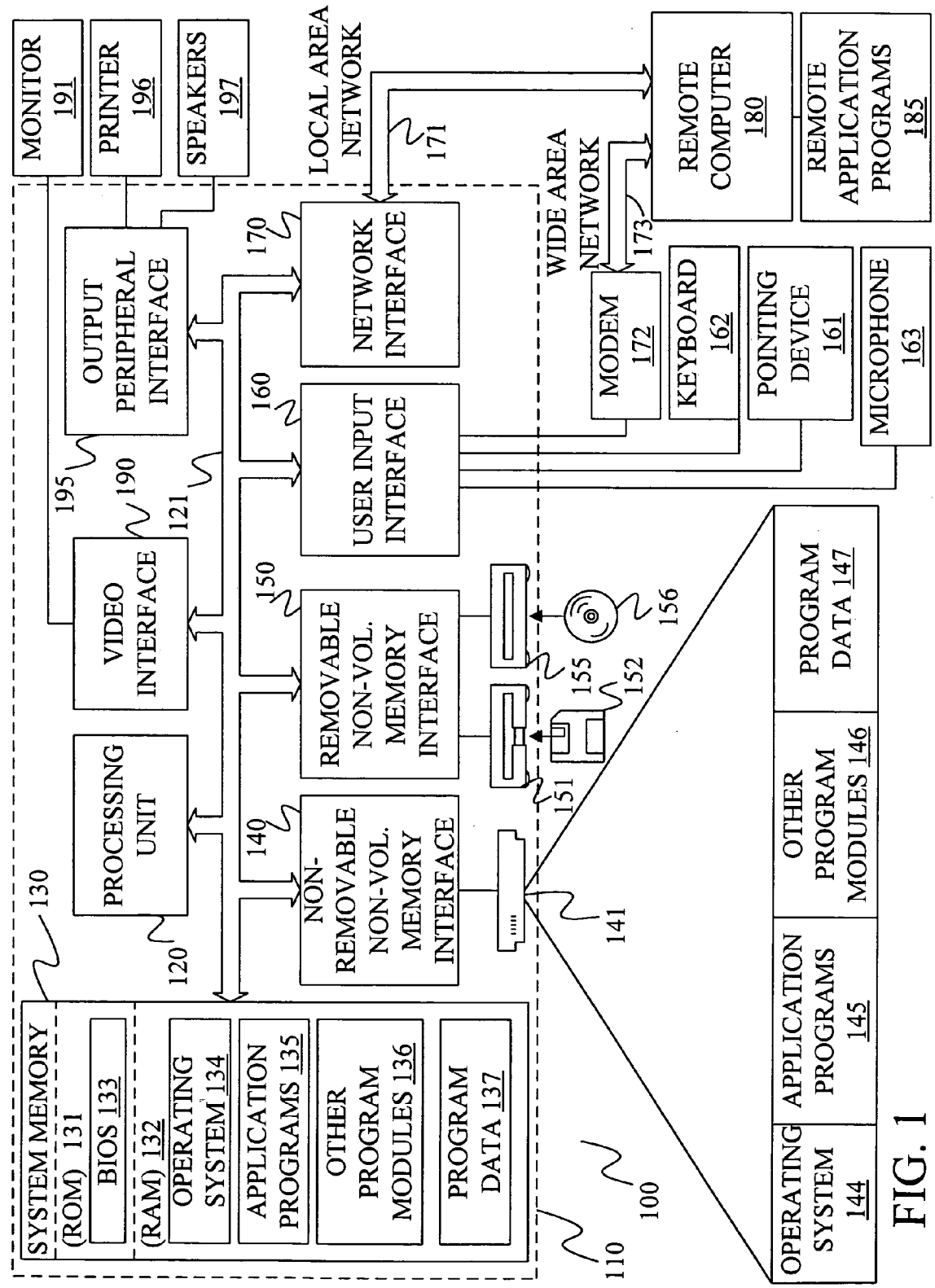
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
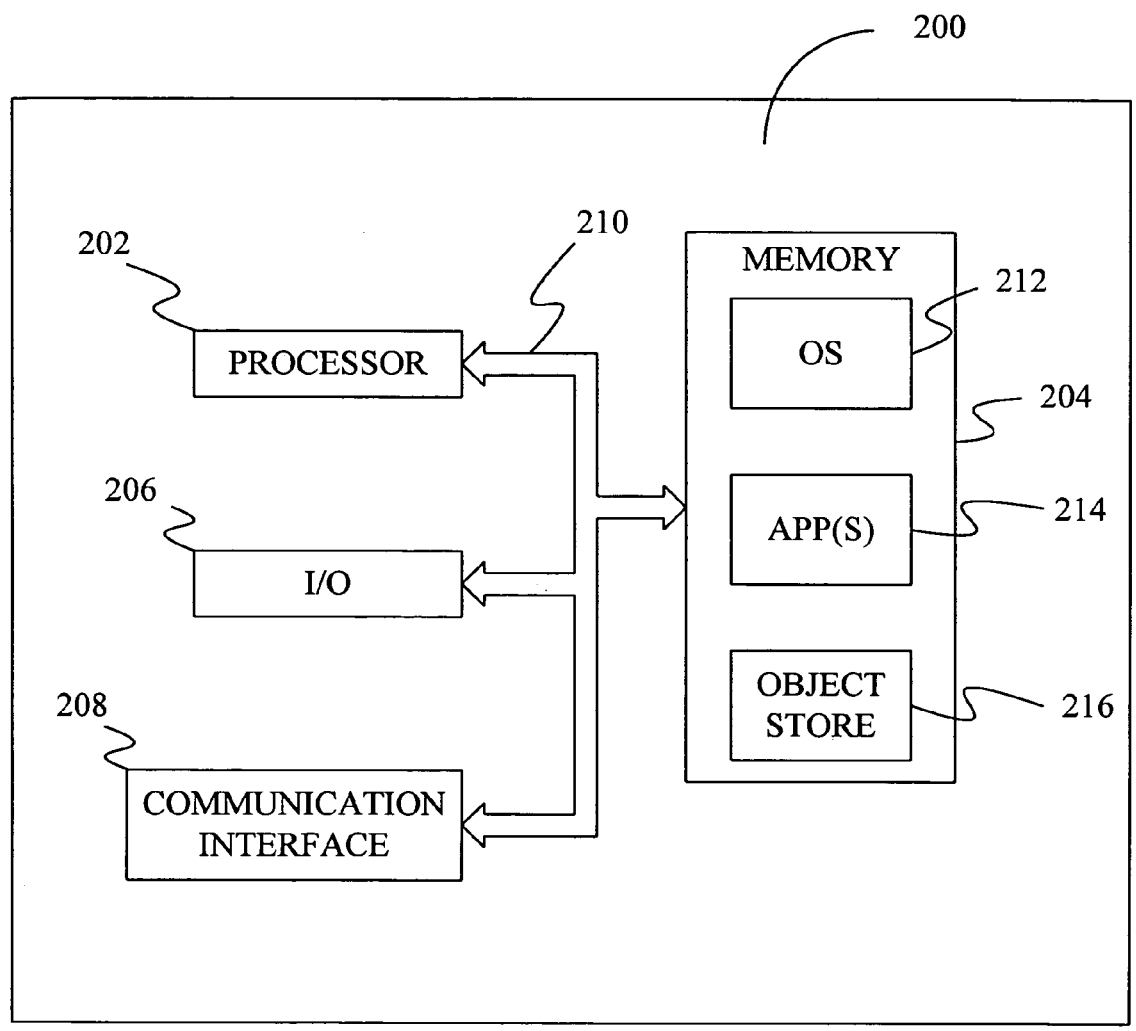
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory. (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

The present invention provides a method and apparatus for automatically laying out forms based on the size of text in the form by utilizing a set of automatic layout parameters that are separate from the automatic layout code.

Figure 3:
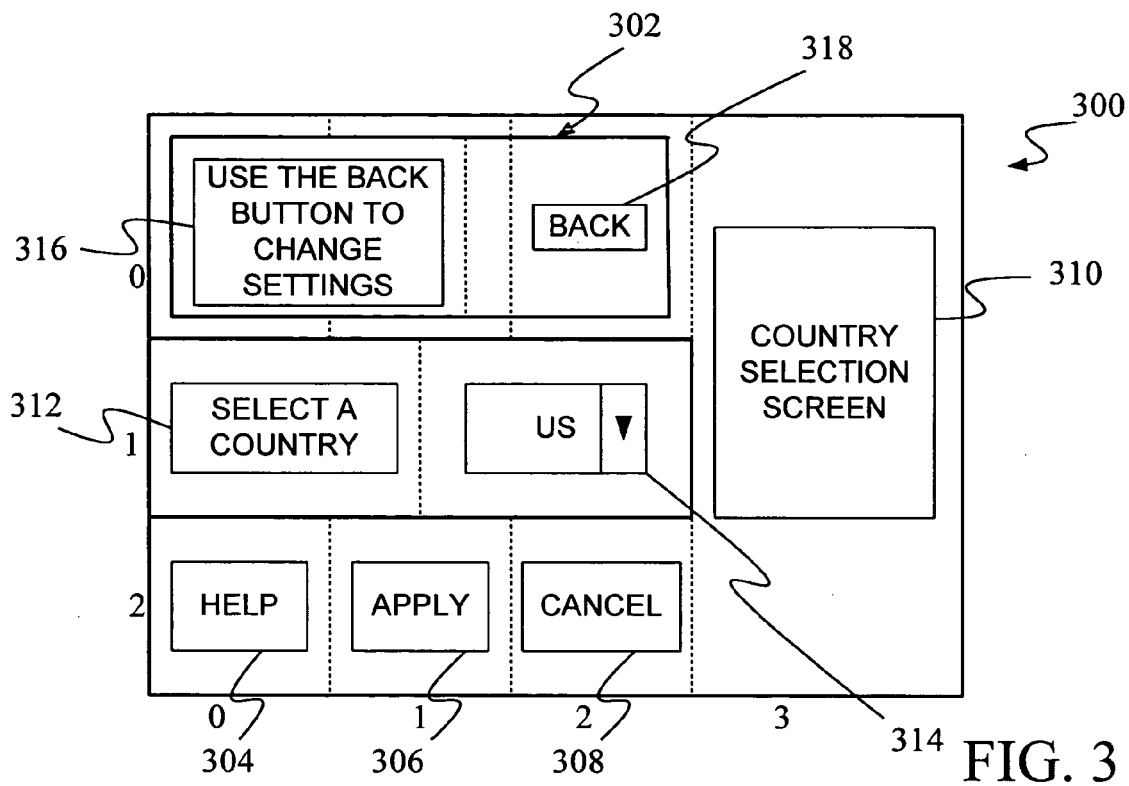
FIG. 3 is a diagram of a form showing displayed controls and virtual columns and rows.

FIG. 3 provides a diagram of a sample form 300 that includes panel 302, HELP button 304, APPLY button 306, CANCEL button 308, column label 310, label 312 and combo box 314. Panel 302 includes label 316 and BACK button 318. In FIG. 3, dashed lines represent grid lines that are used in performing the automatic layout function of the present invention. These grid lines do not appear when the form is displayed.

Figure 4:
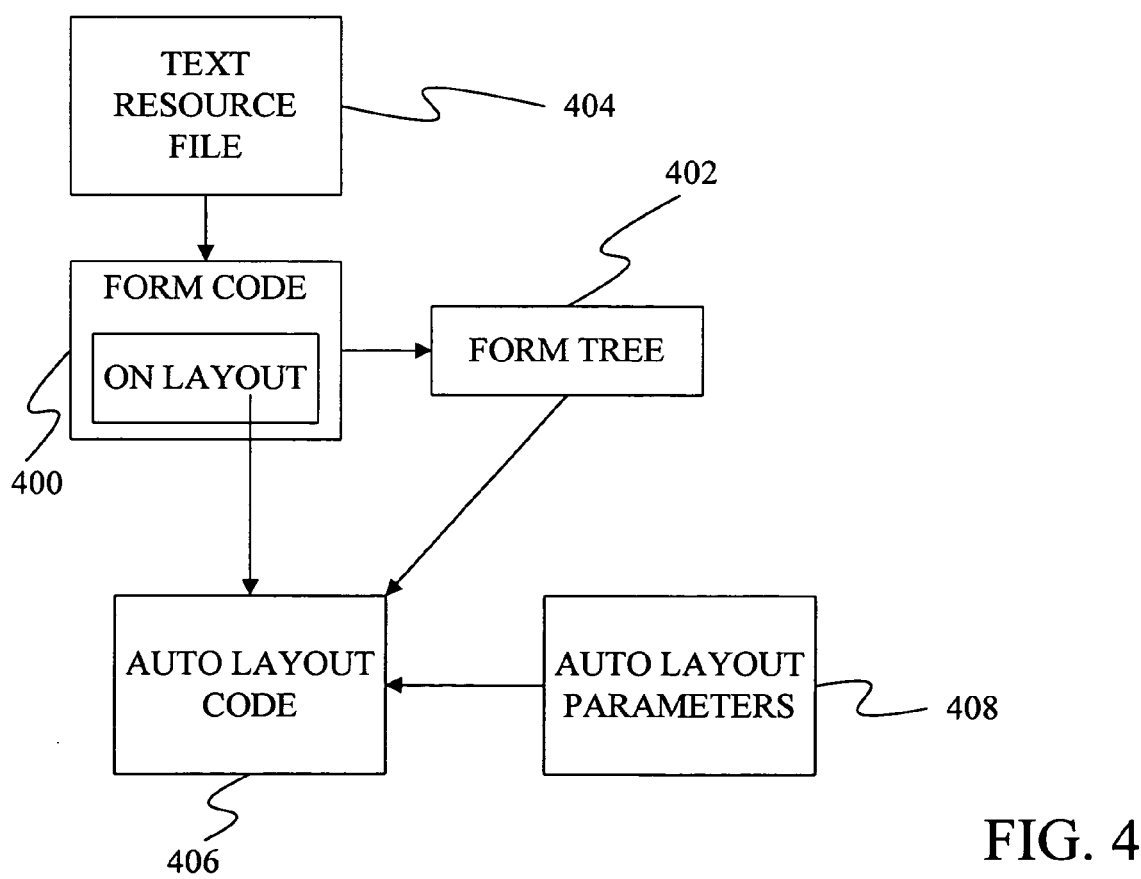
FIG. 4 is a block diagram of elements used to automatically layout a form under the present invention.

FIG. 4 provides a block diagram of components used under the present invention to perform of an automatic layout of a form. In FIG. 4, form code 400 defines the operation of the form. When form code 400 is instantiated, it generates a form tree 402 that defines the hierarchical structure of control nodes in the form. For example, in FIG. 3, back button 318 is a child control node of panel 302, which is a child node of form 300. In form tree 402, form code 400 sets the properties for the various controls. One of these properties includes text that is to appear in the control on the form. Under many embodiments, this text is taken from a text resource file 404. Text resource file 404 is separate from form code 400 and may be modified without recompiling form code 400. As such, the text that appears in the controls can be changed without recompiling form code 400.

Once form tree 402 has been constructed, form code 400 triggers an ON LAYOUT event. This event causes a procedure in the form to call auto layout code 406. Auto layout code 406 uses form tree 402 and a set of auto layout parameters 408 to position and align the controls within the form. Auto layout parameters 408 define the alignment and growth parameters of the various controls in the forms. In one embodiment, auto layout parameters 408 are provided as an extensible Markup Language (XML) document.

Since auto layout parameters 408 are separate from auto layout code 406 and form code 400, auto layout code 406 and form code 400 do not need to be recompiled in order to change the manner in which auto layout code 406 aligns the control elements of the form during the automatic layout process.

An example of auto layout parameters 408 written in XML is provided below:

```
<FormAutoLayout>
   <Container>
      <Target>Form2</Target>
      <ContainerFill>False</ContainerFill>
      <Grid>
         <GridX>0</GridX>
         <GridY>0</GridY>
         <SpanX>0</SpanX>
         <SpanY>0</SpanY>
         <VerticalPrePadding>0</VerticalPrePadding>
         <VerticalPostPadding>0</VerticalPostPadding>
         <HorizontalPrePadding>0</HorizontalPrePadding>
         <HorizontalPostPadding>0</HorizontalPostPadding>
         <HorizontalAlignment>
            Stretch
         </HorizontalAlignment>
         <VerticalAlignment>Stretch</VerticalAlignment>
         <GrowingRows>1</GrowingRows>
         <GroupedRows></GroupedRows>
         <GrowingColumns>0,1,2</GrowingColumns>
         <GroupedColumns>0,1,2</GroupedColumns>
         <Control>
            <Name>Panel1</Name>
            <UseTextSizeAsMinimum>
               False
            </UseTextSizeAsMinimum>
            <GridX>0</GridX>
            <GridY>0</GridY>
            <SpanX>2</SpanX>
            <SpanY>0</SpanY>
            <VerticalPostPadding>0</VerticalPostPadding>
            <VerticalPrePadding>0</VerticalPrePadding>
            <HorizontalPostPadding>
               0
            </HorizontalPostPadding>
            <HorizontalPrePadding>0</HorizontalPrePadding>
            <HorizontalAlignment>
               Stretch
            </HorizontalAlignment>
            <VerticalAlignment>
               Stretch
            </VerticalAlignment>
            <HorizontalTextPadding>
               0
            </HorizontalTextPadding>
            <VerticalTextPadding>0</VerticalTextPadding>
         </Control>
         <Control>
            <Name>btnHelp</Name>
            <UseTextSizeAsMinimum>
               True
            </UseTextSizeAsMinimum>
            <VerticalMinSize>23</VerticalMinSize>
            <HorizontalMinSize>75</HorizontalMinSize>
```

```
            <GridX>0</GridX>
            <GridY>2</GridY>
            <SpanX>0</SpanX>
            <SpanY>0</SpanY>
            <VerticalPostPadding>4</VerticalPostPadding>
            <VerticalPrePadding>0</VerticalPrePadding>
            <HorizontalPostPadding>
                8
            </HorizontalPostPadding>
            <HorizontalPrePadding>8</HorizontalPrePadding>
            <HorizontalAlignment>
                Stretch
            <HorizontalAlignment>
            <VerticalAlignment>Min</VerticalAlignment>
            <HorizontalTextPadding>
                9
            <HorizontalTextPadding>
            <VerticalTextPadding>9</VerticalTextPadding>
        </Control>
        <Control>
            <Name>btnApply</Name>
            <UseTextSizeAsMinimum>
                True
            </UseTextSizeAsMinimum>
            <VerticalMinSize>23</VerticalMinSize>
            <HorizontalMinSize>75</HorizontalMinSize>
            <GridX>1</GridX>
            <GridY>2</GridY>
            <SpanX>0</SpanX>
            <SpanY>0</SpanY>
            <VerticalPostPadding>4</VerticalPostPadding>
            <VerticalPrePadding>0</VerticalPrePadding>
            <HorizontalPostPadding>
                8
            </HorizontalPostPadding>
            <HorizontalPrePadding>8</HorizontalPrePadding>
            <HorizontalAlignment>
                Stretch
            <HorizontalAlignment>
            <VerticalAlignment>Max</VerticalAlignment>
            <HorizontalTextPadding>
                9
            </HorizontalTextPadding>
            <VerticalTextPadding>9</VerticalTextPadding>
        </Control>
        <Control>
            <Name>btnCancel</Name>
            <UseTextSizeAsMinimum>
                True
            </UseTextSizeAsMinimum>
            <VerticalMinSize>23</VerticalMinSize>
            <HorizontalMinSize>75</HorizontalMinSize>
            <GridX>2</GridX>
            <GridY>2</GridY>
            <SpanX>0</SpanX>
            <SpanY>0</SpanY>
            <VerticalPostPadding>4</VerticalPostPadding>
            <VerticalPrePadding>0</VerticalPrePadding>
            <HorizontalPostPadding>
                8
            </HorizontalPostPadding>
            <HorizontalPrePadding>8</HorizontalPrePadding>
            <HorizontalAlignment>
                Stretch
            </HorizontalAlignment>
            <VerticalAlignment>Min</VerticalAlignment>
            <HorizontalTextPadding>
                9
            </HorizontalTextPadding>
            <VerticalTextPadding>9</VerticalTextPadding>
        </Control>
        <Control>
            <Name>ColumnLabel</Name>
            <UseTextSizeAsMinimum>
                True
            </UseTextSizeAsMinimum>
            <VerticalMinSize>90</VerticalMinSize>
            <HorizontalMinSize>75</HorizontalMinSize>
            <GridX>3</GridX>
            <GridY>0</GridY>
            <SpanX>0</SpanX>
            <SpanY>2</SpanY>
            <VerticalPostPadding>5</VerticalPostPadding>
            <VerticalPrePadding>5</VerticalPrePadding>
            <HorizontalPostPadding>
                5
            </HorizontalPostPadding>
            <HorizontalPrePadding>5</HorizontalPrePadding>
            <HorizontalAlignment>
                Stretch
            </HorizontalAlignment>
            <VerticalAlignment>Stretch</VerticalAlignment>
            <HorizontalTextPadding>
                9
            </HorizontalTextPadding>
            <VerticalTextPadding>9</VerticalTextPadding>
        </Control>
        <Grid>
            <GridX>0</GridX>
            <GridY>1</GridY>
            <SpanX>2</SpanX>
            <SpanY>0</SpanY>
            <VerticalPostPadding>8</VerticalPostPadding>
            <VerticalPrePadding>8</VerticalPrePadding>
            <HorizontalPostPadding>
                16
            </HorizontalPostPadding>
            <HorizontalPrePadding>16</HorizontalPrePadding>
            <HorizontalAlignment>
                Stretch
            </HorizontalAlignment>
            <VerticalAlignment>Stretch</VerticalAlignment>
            <GrowingRows></GrowingRows>
            <GroupedRows></GroupedRows>
            <GrowingColumns></GrowingColumns>
            <GroupedColumns>0,1</GroupedColumns>
            <Control>
                <Name>lablelforcombo</Name>
                <GridX>0</GridX>
                <GridY>0</GridY>
                <SpanX>0</SpanX>
                <SpanY>0</SpanY>
                <UseTextSizeAsMinimum>
                    True
                </UseTextSizeAsMinimum>
                <VerticalMinSize>21</VerticalMinSize>
                <HorizontalMinSize>75</HorizontalMinSize>
                <VerticalPostPadding>0</VerticalPostPadding>
                <VerticalPrePadding>0</VerticalPrePadding>
                <HorizontalPostPadding>
                    0
                </HorizontalPostPadding>
                <HorizontalPrePadding>
                    16
                </HorizontalPrePadding>
                <HorizontalAlignment>
                    Max
                </HorizontalAlignment>
                <VerticalAlignment>Center</VerticalAlignment>
                <HorizontalTextPadding>
                    5
                </HorizontalTextPadding>
                <VerticalTextPadding>5</VerticalTextPadding>
            </Control>
            <Control>
                <Name>combobox1</Name>
                <GridX>1</GridX>
                <GridY>0</GridY>
                <SpanX>0</SpanX>
                <SpanY>0</SpanY>
                <UseTextSizeAsMinimum>
                    True
                </UseTextSizeAsMinimum>
                <VerticalMinSize>21</VerticalMinSize>
                <HorizontalMinSize>75</HorizontalMinSize>
                <VerticalPostPadding>0</VerticalPostPadding>
                <VerticalPrePadding>0</VerticalPrePadding>
                <HorizontalPostPadding>
```

-continued

```
        16
    </HorizontalPostPadding>
    <HorizontalPrePadding>
        5
    </HorizontalPrePadding>
    <HorizontalAlignment>
        Min
    </HorizontalAlignment>
    <VerticalAlignment>Center</VerticalAlignment>
    <HorizontalTextPadding>
        5
    </HorizontalTextPadding>
    <VerticalTextPadding>5</VerticalTextPadding>
        </Control>
      </Grid>
    </Grid>
  </Container>
  <Container>
    <Target>Panel1</Target>
    <Grid>
      <GridX>0</GridX>
      <GridY>0</GridY>
      <SpanX>0</SpanX>
      <SpanY>0</SpanY>
      <VerticalPostPadding>0</VerticalPostPadding>
      <VerticalPrePadding>0</VerticalPrePadding>
      <HorizontalPostPadding>0</HorizontalPostPadding>
      <HorizontalPrePadding>0</HorizontalPrePadding>
      <HorizontalAlignment>
        Stretch
      </HorizontalAlignment>
      <VerticalAlignment>Stretch</VerticalAlignment>
      <GrowingRows></GrowingRows>
      <GroupedRows></GroupedRows>
      <GrowingColumns>1</GrowingColumns>
      <GroupedColumns></GroupedColumns>
      <Control>
        <Name>panellabel</Name>
        <UseTextSizeAsMinimum>
            True
        </UseTextSizeAsMinimum>
        <VerticalMinSize>20</VerticalMinSize>
        <HorizontalMinSize>75</HorizontalMinSize>
        <GridX>0</GridX>
        <GridY>0</GridY>
        <SpanX>0</SpanX>
        <SpanY>0</SpanY>
        <VerticalPostPadding>5</VerticalPostPadding>
        <VerticalPrePadding>5</VerticalPrePadding>
        <HorizontalPostPadding>
            5
        </HorizontalPostPadding>
        <HorizontalPrePadding>5</HorizontalPrePadding>
        <HorizontalAlignment>
            Stretch
        </HorizontalAlignment>
        <VerticalAlignment>Stretch</VerticalAlignment>
        <HorizontalTextPadding>
            9
        </HorizontalTextPadding>
        <VerticalTextPadding>9</VerticalTextPadding>
    </Control>
    <Control>
        <Name>btnBack</Name>
        <UseTextSizeAsMinimum>
            True
        </UseTextSizeAsMinimum>
        <VerticalMinSize>20</VerticalMinSize>
        <HorizontalMinSize>75</HorizontalMinSize>
        <GridX>2</GridX>
        <GridY>0</GridY>
        <SpanX>0</SpanX>
        <SpanY>0</SpanY>
        <VerticalPostPadding>5</VerticalPostPadding>
        <VerticalPrePadding>5</VerticalPrePadding>
        <HorizontalPostPadding>
            5
        </HorizontalPostPadding>
        <HorizontalPrePadding>5</HorizontalPrePadding>
        <HorizontalAlignment>
            Stretch
        </HorizontalAlignment>
        <VerticalAlignment>Stretch</VerticalAlignment>
        <HorizontalTextPadding>
            9
        </HorizontalTextPadding>
        <VerticalTextPadding>9</VerticalTextPadding>
    </Control>
    </Grid>
  </Container>
</FormAutoLayout>
```

In the example above, the auto layout parameters for an application are defined within <FormAutoLayout> tags. Within the <FormAutoLayout> tags, three types of entities are defined. A container entity, defined between <Container> tags, is an entity that may hold a collection of control elements. Examples of such entities include forms and panels. The second type of entity defined in the form auto layout definition is a grid entity, defined within <Grid> tags. A grid entry is a virtual entity that does not appear on the rendered form. Instead, a grid entity defines a set of rows and columns that are used to position child entities defined within the <Grid> tags. Such child entities can include child grid entities. The third type of entity defined in the form auto layout definition is a control entity. Each control entity is associated with a control element in the form such as a panel, a button, a label, or a box.

The position of a grid entity or a control entity is defined within a set of <GridX> and <GridY> tags within the entities outer tags. The value between the <GridX> tags indicates the virtual column that the entity begins in and the value in the <GridY> tags indicates the virtual row that the entity begins in. Grid and control entities may span more than one column or row. The number of columns spanned by an entity is designated by a value between <SpanX> tags and the number of rows that the entity spans is designated between <SpanY> tags. Under one embodiment of the present invention, the rows and columns are numbered beginning with the value of zero and increasing with each column in a left to right manner and increasing with each row in a top to bottom manner. In addition, an entity that occupies a single row or a single column is said to span zero columns or rows. Thus, an entity that occupies three columns will have a SPANX value of 2.

The space where an entity may be located within the rows and columns it occupies can be limited by setting padding values that define pads or margins along the edges of the rows and columns occupied by the entity. In particular, a value between <VerticalPrePadding> tags indicates the size of a pad in pixels that extends from the top-most edge of the top most row spanned by the entity; the value in the <VerticalPostPadding> tags indicates the size of a pad in pixels that extends upward from the bottom edge of the bottom-most row spanned by the entity; the value in the <HorizontalPrePadding> tags indicates the size of a pad in pixels extending to the right from the left edge of the left-most column and the value in the <HorizontalPostPadding> tags indicates the size of a pad in pixels extending to the left from the right edge of the right-most column spanned by the entity. Note that although the sizes of the pads are described above in terms of pixels, in other embodiments, other distance measures may be used including logical measures that allow scaling.

Within the space defined by the inner edges of the padding, the entity may be aligned horizontally in one of four different ways and vertically in one of four different ways. The horizontal and vertical alignments are designated in <HorizontalAlignment> tags and <VerticalAlignment> tags, respectively. The possible values for the horizontal and vertical alignments are:

max: places the entity next to the right pad for horizontal alignment and next to the bottom pad for vertical alignment;

min: places the entity next to the left pad for horizontal alignment and next to the top pad for vertical alignment;

center: centers the entity within the space defined by the interior edges of the padding; and stretch: expands the entity to occupy all of the space between the left and right pads for horizontal alignment and between the top an bottom pads for vertical alignment.

Grid entities include <GrowingRows> tags and <GrowingColumns> tags, which are used to designate those rows and columns within the grid that are to be expanded when distributing excess space across the grid. This excess space is the difference between the minimum size for the grid and the desired size for the grid. When rows or columns are designated as growing rows or growing columns, only those rows or columns are expanded when assigning excess space. If no rows are designated as growing rows, the excess space in the vertical direction is distributed evenly across all rows of the grid. If no columns are designated as growing columns, the excess space in the horizontal direction is distributed evenly across all columns of the grid.

The grid definition also includes tags for <GroupRows> and <GroupColumns>. Rows or columns that are found between a set of group rows or grouped columns are forced to have the same size as each other. Thus, if one column in a set of group columns has its size increased, all of the other columns in the group must have their size increased to match. Multiple sets of grouped rows and grouped column tags may be present in a grid definition.

For a control entity, a set of tags is provided for determining the minimum size of the control. One set of tags, <VerticalMinSize> and <HorizontalMinSize>, designate the minimum vertical and horizontal size, respectively, in terms of pixels for the control entity. The tag <UseTextSizeAs Minimum> takes Boolean values and indicates whether the minimum size of the control is to be set based on the text associated with the control. When this Boolean value is true, auto layout code 406 determines the minimum size of the control by requesting the size of the text that has been associated with the control in form tree 402. Many operating systems provide functions that return the size of text given the text, its font and its font size. The size of the text is returned in terms of pixels.

Control nodes may also include tags for defining padding between the edges of the text and the edges of the control. This padding is defined in terms of pixels by designating values between the tags <HorizontalTextPadding> and the tags <VerticalTextPadding>.

Each control includes a pair of <Name> tags that have a name value that associates the control with its definition in form tree 402. Thus, the name of the control in the <Name> tags corresponds to the name of the control in form tree 402.

As shown in the example above, grid nodes may be nested within each other to form a hierarchy of grids. Containers are not nested within each other.

Figure 5:
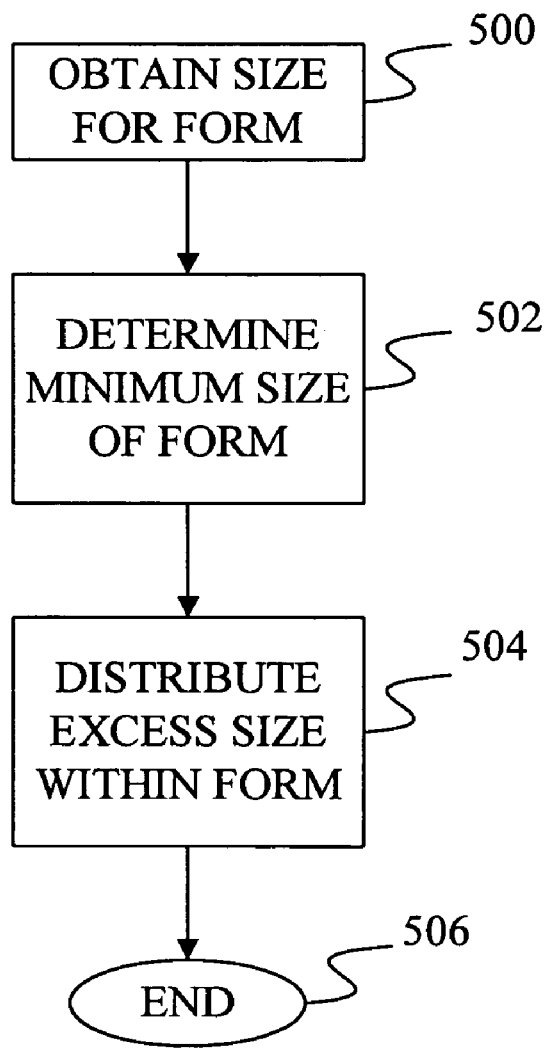
FIG. 5 is a flow diagram of a method of performing an automatic layout under the present invention.

FIG. 5 provides a flow diagram for a method for setting the layout of a form automatically to adjust to the size of text in the form.

In step 500, the size for the entire form is obtained. This size is typically set in the instructions that instantiate the form. At step 502, the minimum size for the form is determined. This minimum size is based on the minimum size of the controls in the form. For those controls that use the text size as their minimum, the minimum size of the controls is determined based on the text assigned to the controls. The process for determining the minimum size of a control is discussed further below in connection with FIGS. 6 and 7. After the minimum size of the form has been determined, the difference between the desired size for the form determined in step 500 and the minimum size determined in step 502 is distributed as excess size within the form at step 504. Once the excess space has been distributed within the form, the process ends at step 506.

Figure 6:
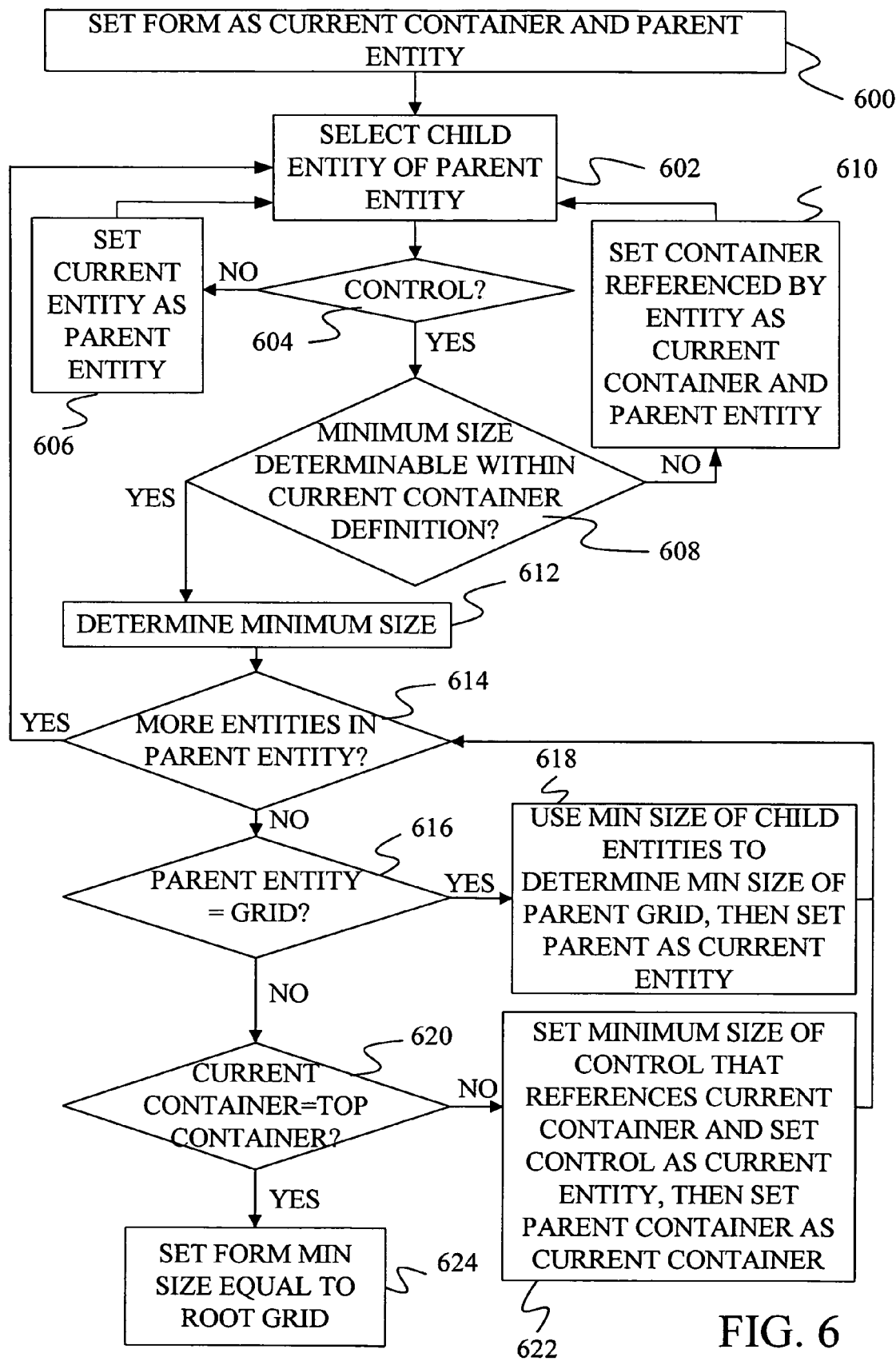
FIG. 6 is a flow diagram for determining the minimum size of a form.

FIG. 6 provides a flow diagram for determining the minimum size of a form. At step 600 of FIG. 6, the form is set as the current container. Using the auto layout parameters 408 for the form, the first entity defined in the container tags for the form is selected. In most embodiments, the container contains a root grid entity, which forms the top-most entity of the container. After an entity is selected at step 602, the process of FIG. 6 determines if the selected entity is a control entity at step 604. If the selected entity is not a control, it is a grid entity and the process continues at step 606, where the grid entity is set as the parent entity. The process then returns to step 602 to select a child entity of the newly set parent entity. Through steps 604, 606, and 602, the process is able to perform a recursion into nested grid entities.

When a child entity selected at step 602 is a control entity at step 604, the process of FIG. 6 determines if the minimum size for the control can be determined within the current container definition at step 608. The minimum size for a control is determinable within a current container definition if values are provided for the <VerticalMinSize> and <HorizontalMinSize> tags or if the <UseTextSizeAsMinimum> tags are set to True. If the <UseTextSizeAsMinimum> tags are set to False and no <VerticalMinSize> or <HorizontalMinSize> value has been set for the control, the minimum size for the control cannot be determined from the current container definition. This can occur when the control represents a container and the minimum size of that container can only be determined through the container definition associated with that control. For example, a panel will appear as a control in a container definition. However, the minimum size of the panel will often be defined through the panel's own container definition.

In FIG. 6, if the minimum size is not determinable within the current container definition at step 608, the process continues at step 610 where the container referenced by the control is set as the current container and as the parent entity. The process then returns to step 602 to select a child entity of the referenced container. For example, in the layout above, when the control definition for the Panel1 control is selected at step 602, its minimum size cannot be determined. As a result, the container definition for Panel1, which is found between <Container> tags that include a pair of <Target> tags with the value of "Panel1", is set as the current container and is set as the parent entity in step 610. A child entity of that container definition is then selected at step 602. Thus, using steps 608, 610, and 602, the present invention is able to perform a recursion into imbedded containers defined within a larger container.

If the minimum size of the selected control node can be determined at step 608, its minimum size is determined at step 612. To determine the minimum size of a control node, the method first looks at the <UseTextSizeAsMinimum> value to see if it has been set to False. If it has been set to False, the initial minimum sizes of the control are determined by the sizes set in the <VerticalMinSize> and <HorizontalMinSize> tags.

If the <UseTextSizeAsMinimum> value is True, the process requests the minimum size required for the text associated with the control. For example, for HELP button 304, the process would request the text associated with the button from the form tree 402. This text would then be passed to an operating system method that will return the vertical and horizontal dimensions of the text in terms of pixels. Once the dimensions of the text have been returned to the process, the vertical dimensions of the text are compared to the minimum size set in the <VerticalMinSize> tags and the horizontal dimensions are compared to the minimum size set in the <HorizontalMinSize> tags. The larger of the two horizontal values is then selected as the initial minimum horizontal dimension for the control and the larger of the two vertical dimensions is selected as the initial minimum vertical dimension for the control.

The initial minimum horizontal dimension for the control is then added to the value provided in the <HorizontalTextPadding> tags, if any, and to the values provided in the <HorizontalPrePadding> and <HorizontalPostPadding> tags, if any, to determine the final minimum horizontal dimension of the control. Similarly, the initial minimum vertical dimension for the control is added the value in the <VerticalTextPadding> tags, if any, and to the values in the <VerticalPrePadding> and <VerticalPostPadding> tags, if any, to determine the final minimum vertical dimension for the control.

After the minimum size has been determined for the control at step 612, the process of FIG. 6 continues at step 614 where it determines if there are more child entities in the parent entity. If there are more child entities, the next child entity is selected at step 602. If there are no more entities in the parent entity, the process continues at step 616 where it determines if the parent entity is a grid. If the parent entity is grid, the process continues at step 618 where the minimum sizes of the child entities in the grid are used to determine the minimum size of the parent grid. The parent grid is then set as the current entity.

Figure 7:
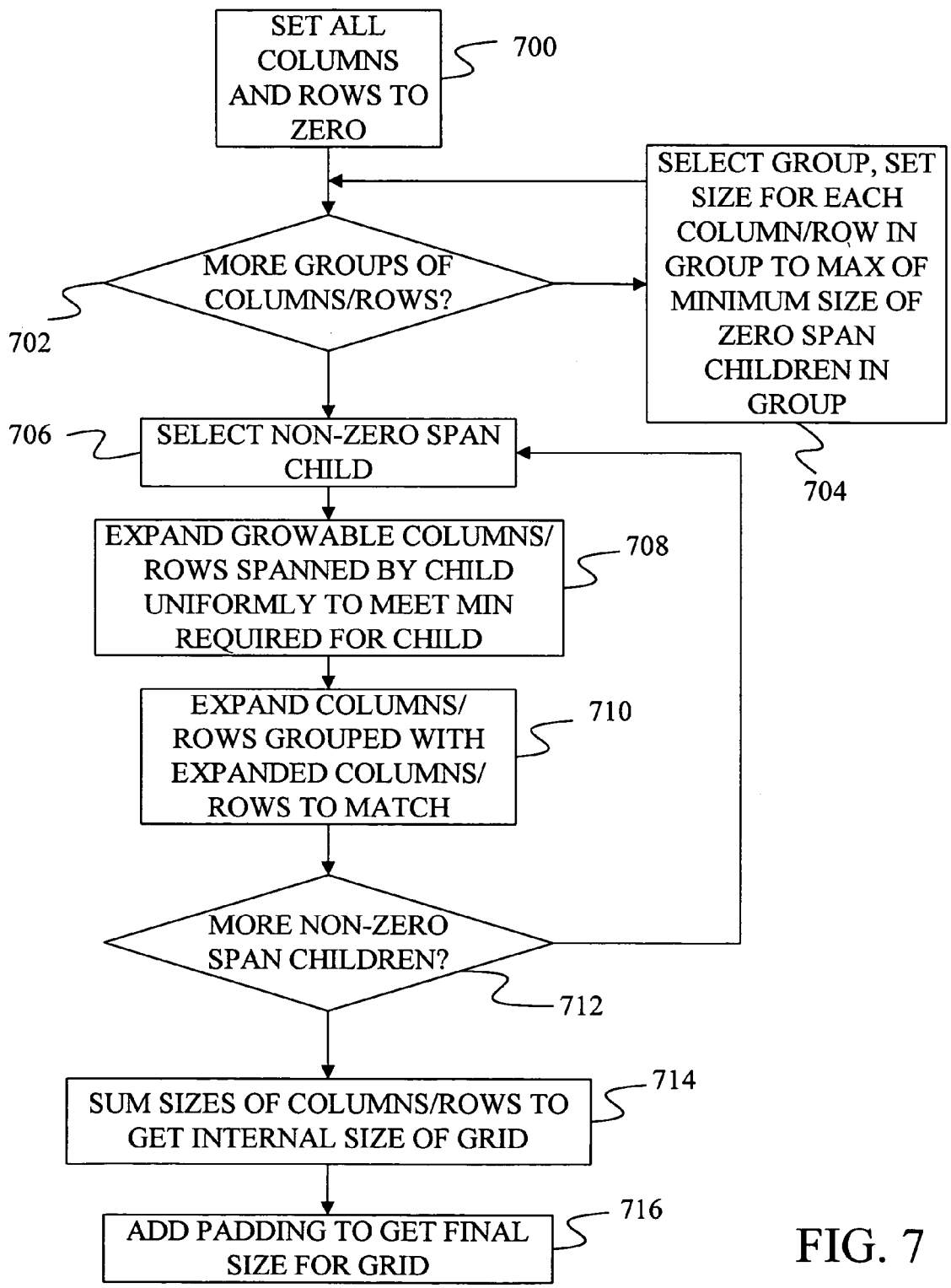
FIG. 7 is a flow diagram of a method for determining a minimum size of a grid node under the present invention.

FIG. 7 provides a flow diagram of a process for performing step 618 of FIG. 6. At step 700, all of the columns and rows of the grid have their dimensions set to zero. At step 702, the tags provided for the grid are searched to determine if any grouped rows or grouped columns are present and have not been processed. If a set of grouped columns or rows has not been processed, it is selected at step 704 and the size for each column or row in the group is set to the maximum of the minimum size of any child entities that have a zero span and are located in one of the columns/rows of the group.

Thus, if three columns were grouped together, and a zero-span child entity has a horizontal dimension of 10 in the first column, and a zero-span child entity has a horizontal dimension of 25 in a second column, all of the columns in the group would have their horizontal dimension set to 25. Similarly, in a group of rows, if a zero-span child entity has a vertical dimension of 15 in a first row and a zero-span child entity in a second row has a vertical dimension of 8, all of the vertical dimensions for the rows in the group would be set to 15. Steps 702 and 704 are repeated until all of the groups for the grid have been processed.

At step 706, a non-zero span child entity of the grid is selected. At step 708, all of the growable columns and rows spanned by the child entity are expanded uniformly to meet the minimum size required for the child entity. For example, if a child entity spans two columns, but only one of the columns is growable, only that column will be grown horizontally to accommodate the minimum required for the child entity. Note that columns are grown horizontally and rows are grown vertically and that all columns extend the entire length of the grid and all rows extend the entire width of the grid.

At step 710, rows and columns grouped with rows and columns that were expanded in step 708 are also expanded so that their size matches the size of the rows and columns that were expanded at step 708. This ensures that all grouped rows and columns have the same dimensions. At step 712, the process determines if there are more non-zero span child entities of the grid. If there are more non-zero span child entities, the next non-zero span child entity is selected at step 706 and steps 708 and 710 are repeated.

When there are no more non-zero span child entities at step 712, the process continues at step 714 where the horizontal dimensions of all of the columns in the grid are summed to provide the horizontal dimension of the grid and the vertical dimensions of all of the rows in the grid are summed to provide the vertical dimension of the grid. At step 716, padding values associated with the <VerticalPrePadding> and <VerticalPostPadding> tags of the grid are added to the vertical dimension of the internal size of the grid, and padding values associated with the <HorizontalPrePadding> and <HorizontalPostPadding> tags of the grid are added to the horizontal dimension of the internal size of the grid to provide the final size for the grid at step 716.

Returning to FIG. 6, after the minimum size of the grid has been determined at step 618, and the grid has been set as the current entity, the process returns to step 614 to determine if there are more child entities for the parent of the grid. If there are more child entities, the process returns to step 602. Through steps 618 and 614, the process of FIG. 6 is able to step back up to the parent entity after performing the recursion for the grid.

When the parent entity of the current entity is not a grid node at step 616, the process continues at step 620 where it determines if the current container is top container. Note that the only time a parent entity will not be equal to a grid in step 616 is when the parent entity is a container. If the current container is not the top container, for example if the current container represents a panel that is found within a form container, the process continues at step 622 where the minimum size of the control that references the current container is set equal to the size of the current container. In addition, the control that references the current container is set as the current entity. The parent container of the current container is then set as the current container and the process returns to step 614. Thus, through steps 620 and 622, after determining the minimum size recursively for a nested container, the process returns to processing the parent entity in which the nested container is referenced.

When the process reaches step 620 and the current container is the top container, the minimum size for the form is set equal to the minimum size determined for the root grid entity of the form. This is shown as step 624 in FIG. 6.

Figure 8:
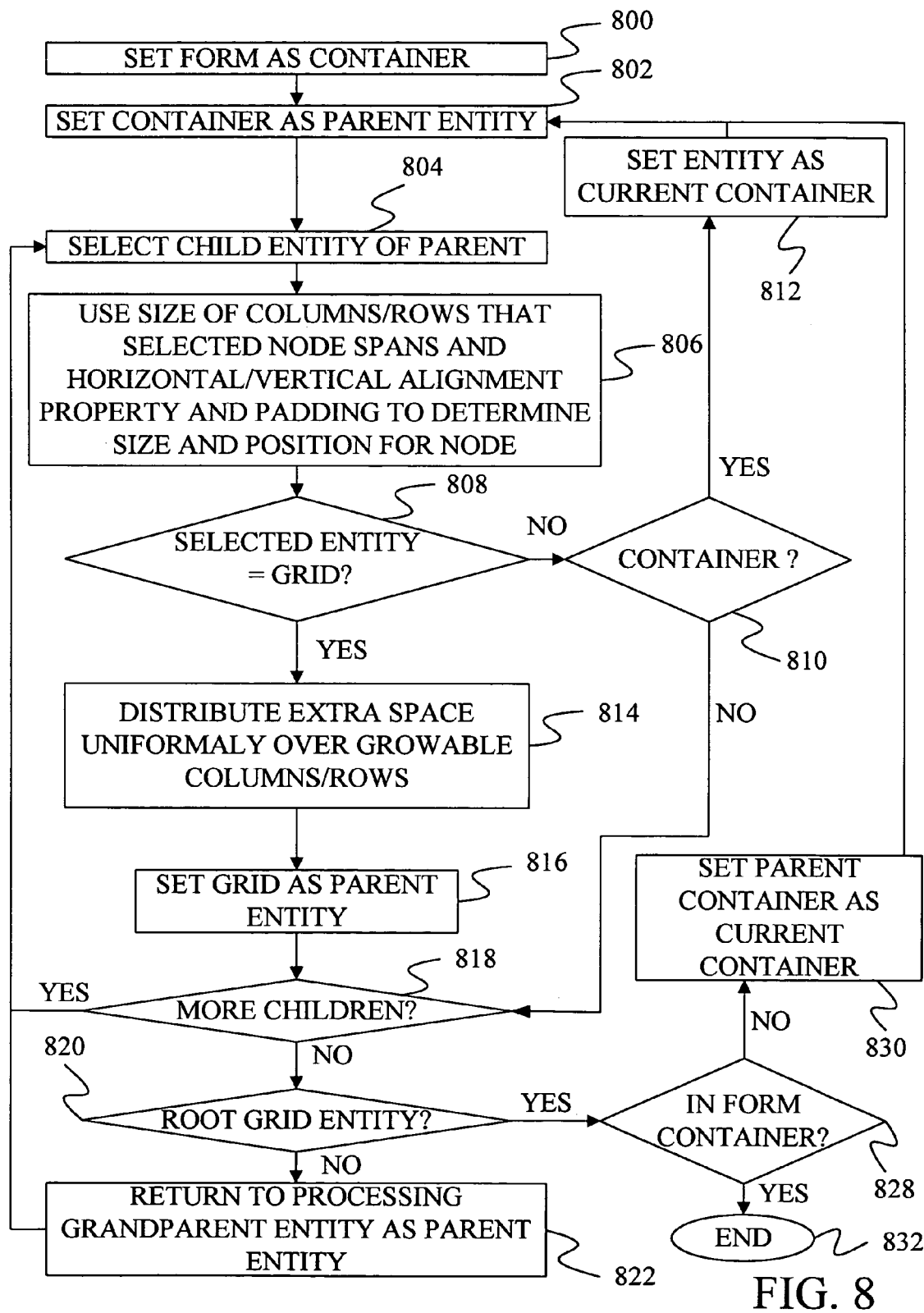
FIG. 8 is a flow diagram of a method for distributing excess space under the present invention.

FIG. 8 provides a flow diagram for distributing the excess size within a form. At step 800, the form is set as the current container. At step 802, the current container is set as the parent entity and at step 804 a child entity of the parent entity is selected. Using the size of the columns and rows that the selected entity spans and the horizontal/vertical alignment property and padding properties, the size and position for the entity is determined at step 806. For a form container, there is one row and one column where the column has a width equal to the desired size for the form and the row has a vertical dimension equal to the desired vertical dimension of the form.

The size of the columns and rows define a space that is reduced based on the padding associated with the child entity. Within the space left after padding, the child entity can be positioned at the edges of the space if the alignment properties are MAX or MIN, or in the center of the space if the alignment properties are CENTER. In addition, the child entity can be positioned across the entire space after padding if the alignment properties are set to STRETCH.

After the position and size of the selected entity has been determined at step 806, the process determines if the selected entity is a grid entity at step 808. If the selected entity is not a grid entity, but instead a control entity, the process determines if the control entity has an associated container definition and therefor represents an embedded container at step 810. If the entity is a container, its container definition is set as the current container at step 812 and the process returns to step 802 to set the current container as the parent entity. In this manner, the process of FIG. 8 is able to recursively move down through container entities that are embedded into other container nodes. If the control entity does not represent a container at step 810, the process returns to step 804 to select the next child entity of the parent entity.

If the entity selected at step 804 is a grid at step 808, the process continues at step 814 where the difference between the size determined for the entity at step 806 and the minimum size for the grid is distributed as extra space uniformly over all the growable columns/rows of the grid. If none of the columns or rows are listed as growable, the extra space is distributed uniformly across all columns and rows. For example, if rows 2 and 4 were growable, the vertical extra space would be divided in two and assigned equally to rows 2 and 4. The vertical dimensions of rows 1 and 3 would be left at the minimum vertical space. However, if none of the rows were designated as being growable, the extra vertical space would be distributed evenly across all four of the rows.

After the extra space for the grid has been distributed across the growable columns/rows, the grid entity is set as the parent entity at step 816. The process then determines if there are child entities for the new parent entity at step 818. If there are child entities, the process returns to step 804 to select one of the child entities. The newly sized rows and columns of the grid are then used to resize the child entity through step 806.

When there are no more child entities at step 818, the process continues at step 820 where it determines if the parent grid is the root grid entity for a container. If parent grid is not a root grid entity, the process continues at step 822 where it sets the parent of the grid entity, which is the grandparent of the current child entity, as the parent entity. Thus, when a grid appears as a child entity of another grid, step 822 will return to the processing of the upper level grid after the lower level grid has been expanded.

When the parent grid is the root grid entity for a container at step 820, the process continues at step 824 where it determines if the root grid entity is in a form container. If it is not in a form container, the parent container to the current container is set as the current container at step 830. The process then returns to step 802 to set the current container as the parent entity. This allows the process to return to the expansion of a parent container after expanding an embedded container.

When the parent root grid is in a form container at step 828, all of the nested grids and containers have been expanded and all of the control nodes have been sized and positioned in the form. The process then ends at step 832.

In some embodiments, the minimum size of form is determined for the horizontal dimension and then the vertical dimension. The excess space is then distributed along the horizontal dimension and then the vertical dimension. In other embodiments, the minimum size is determined for the horizontal dimension and then the excess horizontal space is distributed along the horizontal dimension. The minimum size along the vertical dimension is then determined followed by the distribution of excess space along the vertical dimension.

In one embodiment, tags are provided for control entities that allow the minimum size of the vertical dimension to be based on the final horizontal dimension of the control. In particular, these tags allow controls to be sized to accept lines of text that have the property of wrapping to fill a space. Such text will form multiple lines of text that fill the horizontal space provided for the text. Under such embodiments, the final horizontal size for the control is determined first by determining the minimum horizontal size of the form and distributing the excess horizontal space as discussed above. Once this size is set, a routine is called to determine how many lines the text will occupy given the horizontal space it occupies. The number of lines of text and the size of the text are then used to derive the minimum vertical size for the text. This minimum size is then used to determine the minimum vertical size of the form as discussed above. The excess vertical size can then be distributed.

Although the present invention has been described with reference to particular embodiments, workers skilled in the art will recognize that changes may be made in form and detail without departing from the spirit and scope of the invention.

What is claimed is:

1. A computer-readable storage medium having computer-executable instructions stored thereon, the computer-executable instructions comprising:

sizing and alignment parameters that describe a size and alignment of elements to be displayed in a form, at least one sizing parameter indicating that the size of an element should change to accommodate text associated with the element wherein the sizing and alignment parameters comprise parameters that define a grid entity, the grid entity comprising at least one row and at least one column and parameters that group at least two rows together such that all of the rows in a group have a same vertical dimension size; and sizing and positioning instructions, separate from the sizing and alignment parameters such that the sizing and alignment parameters may be modified without having access to the sizing and positioning instructions, the sizing and positioning instructions setting the size and position of elements in the form based on the sizing and alignment parameters.

2. The computer-readable storage medium of claim 1 wherein the sizing and positioning instructions further comprise:

instructions to determine a minimum size for a dimension of the form;

instructions to determine an amount of extra space for the form, the extra space representing the difference between the minimum size for the dimension of the font and a desired size for the dimension of the form; and instructions to distribute the extra space across the form by setting the size of the dimension of at least one element so that it is larger than a minimum size for the dimension of the element.

3. The computer-readable storage medium of claim 2 wherein the instructions to determine the minimum size for the dimension of the form further comprise instructions to determine the minimum size for the dimension for elements in the form.

4. The computer-readable storage medium of claim 3 wherein the instructions to determine the minimum size for the dimension of an element further comprise:
   instructions to obtain text associated with the element;
   instructions to determine the size of the text; and
   instructions to use the size of the text to determine the minimum size for the dimension of the element.

5. The computer-readable storage medium of claim 4 wherein the instructions to use the size of the text to determine the minimum size for the dimension of the element further comprise:
   instructions to compute a minimum size for the element based on the size of the text;
   instructions to compare the minimum size computed from the text to a minimum size for the element designated in the sizing and alignment parameters; and
   instructions to use the larger of the two minimum sizes as the minimum size for the dimension of the element.

6. The computer-readable storage medium of claim 1 wherein the sizing and alignment parameters further comprise parameters that designate at least one row as growable and at least one row as not growable such that the vertical size of the grid entity is changed by changing the vertical size of the rows that are growable without changing the vertical size of the rows that are not growable.

7. The computer-readable storage medium of claim 1 wherein the sizing and alignment parameters further comprise parameters that designate at least one column as growable and at least one column as not growable such that the horizontal size of the grid entity is changed by changing the horizontal size of the rows that are growable without changing the horizontal size of the rows that are not growable.

8. The computer-readable storage medium of claim 1 wherein the sizing and alignment parameters further comprise parameters that group at least two columns together such that all of the columns in a group have a same horizontal dimension size.

9. The computer-readable storage medium of claim 1 wherein the sizing and alignment parameters further designate the position of an element within a grid entity by designating a row and column in the grid entity occupied by at least a portion of the element.

10. The computer-readable storage medium of claim 9 wherein the sizing and alignment parameters further designate rows and columns spanned by the element.

11. A method comprising:
   determining a minimum size of a form based in part on a plurality of text entries to be displayed in a plurality of respective elements in the form;
   determining the difference between the minimum size of the form and a requested size for the form; and
   setting the size and position of elements in the form based at least in part on the difference between the minimum size of the form and the requested size for the form.

12. The method of claim 11 wherein determining a minimum size of the form comprises accessing a set of parameters that describe the alignment and relative positioning of elements in the form and using the parameters to determine the minimum size of the form.

13. The method of claim 12 wherein the set of parameters comprises parameters that describe a grid entity comprising rows and columns.

14. The method of claim 13 wherein the set of parameters further comprise parameters that indicate the location of an element within a grid entity.

15. The method of claim 14 wherein the set of parameters further comprises parameters that indicate the rows and columns of a grid entity spanned by an element.

16. The method of claim 15 wherein determining the minimum size of the form comprises determining the minimum size of a grid entity in the form.

17. The method of claim 16 wherein determining the minimum size of a grid entity comprises determining the minimum size of an element positioned in the grid entity.

18. The method of claim 17 wherein determining the minimum size of a grid entity comprises setting the minimum size of a row in the grid entity so that it is equal to the minimum size of the largest element that is positioned in the row and that does not span other rows.

19. A system comprising:
   a processor;
   a memory communicatively coupled to the processor, the memory having stored therein computer-executable instructions configured to implement the system including;
   a sizing and alignment component, comprising: parameters that describe a size and alignment of elements to be displayed in a form, at least one sizing parameter indicating that the size of an element should change to accommodate text associated with the element wherein the sizing and alignment parameters comprise parameters that define a grid entity, the grid entity comprising at least one row and at least one column and parameters that group at least two rows together such that all of the rows in a group have a same vertical dimension size; and
   a sizing and positioning component comprising: sizing and positioning instructions, separate from the sizing and alignment parameters such that the sizing and alignment parameters may be modified without having access to the sizing and positioning instructions, the sizing and positioning instructions setting the size and position of elements in the form based on the sizing and alignment parameters.

* * * * *